United States Patent
Suzuki

[11] Patent Number: 5,991,840
[45] Date of Patent: Nov. 23, 1999

[54] COMPUTER EXPANSION UNIT WITH CIRCUITRY FOR RELIABLE COMMUNICATION ON AUXILIARY BUS

[75] Inventor: Kazuyoshi Suzuki, Tokyo, Japan

[73] Assignee: Oki Electric Industry Co., Ltd., Tokyo, Japan

[21] Appl. No.: 08/902,634

[22] Filed: Jul. 29, 1997

[30] Foreign Application Priority Data

Jul. 30, 1996 [JP] Japan ................................. 8-200468

[51] Int. Cl.[6] .......................... G06F 13/38; G06F 11/08; H04L 12/26
[52] U.S. Cl. .......................... 710/101; 714/48; 714/750; 370/249
[58] Field of Search .......................... 710/101, 52, 100, 710/33; 714/1, 48, 49, 715, 750, 716, 819; 370/249, 236, 464; 712/224

[56] References Cited

U.S. PATENT DOCUMENTS

| | | | |
|---|---|---|---|
| 4,569,049 | 2/1986 | McNamara | 395/185.05 |
| 4,965,793 | 10/1990 | Polzin et al. | 370/236 |
| 5,414,713 | 5/1995 | Waschura et al. | 371/20.4 |
| 5,754,531 | 5/1998 | Okamoto | 370/249 |
| 5,790,523 | 8/1998 | Ritchie, Jr. et al. | 370/241 |
| 5,838,915 | 11/1998 | Klausmeier et al. | 395/200.45 |

*Primary Examiner*—Gopal C. Ray
*Attorney, Agent, or Firm*—Rabin & Champagne, P.C.

[57] ABSTRACT

When a first expansion unit in a computer sends data on an auxiliary bus directly to a second expansion unit, the second expansion unit sends the same data directly back to the first expansion unit. If the data sent back are not identical to the data originally sent, the first expansion unit generates an error signal. Alternatively, when a first expansion unit in a computer sends data on an auxiliary bus directly to a second expansion unit, the first expansion unit sends identical data in at least two data streams on the auxiliary bus. If the second expansion unit does not receive identical data from all of these data streams, the second expansion unit generates an error signal.

20 Claims, 7 Drawing Sheets

COMPUTER EXPANSION UNIT WITH CIRCUITRY FOR RELIABLE COMMUNICATION ON AUXILIARY BUS

BACKGROUND OF THE INVENTION

The present invention relates to an expansion unit that is installed in a computer and communicates with other expansion units over an auxiliary bus, more particularly to methods and circuitry for reliably transferring data between expansion units on the auxiliary bus.

Expansion units, often referred to as expansion boards or expansion cards, are installed in personal computers and other types of computers to provide functions not originally designed into the computer. For example, expansion units that provide functions related to telephony are available, permitting the practice of computer-telephony integration. A computer-telephony system may employ several expansion units, e.g. one for call processing, another for facsimile transmission, and another for speech processing.

These expansion units are normally connected by a system bus to the computer's central processing unit, and are controlled by application software running on the central processing unit. To enable different expansion units to exchange data without monopolizing the system bus, the expansion units may also be linked by an auxiliary bus, which is not used by the central processing unit. Auxiliary bus standards have become established, enabling expansion units manufactured by different vendors to communicate over the same auxiliary bus. One well-known auxiliary bus standard is the multi-vendor integration protocol, or MVIP.

The MVIP bus standard provides multiplexed bi-directional channels, each carrying data at a rate of sixty-four kilobits per second in each direction. What the MVIP standard fails to provide is a method of confirming that transmitted data have been correctly received. There have accordingly been problems with the reliability of data transferred on the MVIP bus, and other similar auxiliary buses.

SUMMARY OF THE INVENTION

It is therefore an object of the present invention to improve the reliability of data transmitted from one expansion unit to another expansion unit on an auxiliary bus.

A more specific object is to enable an expansion unit sending data on an auxiliary bus to determine whether the data have been correctly received.

Another object is to enable an expansion unit receiving data on an auxiliary bus to determine whether correct data have been received.

According to a first aspect of the invention, a plurality of expansion units communicate directly with one another on an auxiliary bus. The expansion units may all be installed in the same computer, or they may be installed in two or more different computers. Each expansion unit has an interface circuit for sending and receiving data on the auxiliary bus, a delay buffer for temporarily storing data sent on the auxiliary bus, a comparator for comparing data stored in the delay buffer with data received from the auxiliary bus, and a loop-back circuit for looping data received from the auxiliary bus back to be transmitted on the auxiliary bus.

When a first expansion unit sends data to a second expansion unit, the loop-back circuit operates in the second expansion unit. The comparator in the first expansion unit checks whether the data looped back from the second expansion unit are identical to the data that were originally sent to the second expansion unit, these data having been temporarily stored in the delay buffer in the first expansion unit, and outputs an error signal indicating whether the data looped back are identical. Software running on the central processing unit of the computer in which the first expansion unit is installed can use this error signal to take appropriate corrective action when the looped-back data are not identical.

Each expansion unit may also have a pattern generator that generates a data pattern responsive to the error signal output by the comparator in the same expansion unit. When a first expansion unit sends data to a second expansion unit on the auxiliary bus, the first expansion unit also sends the generated data pattern on the auxiliary bus, e.g. in a different data stream on the auxiliary bus. By monitoring the data pattern, the second expansion unit can determine whether data are being received reliably. Each expansion unit may also have a masking circuit for masking unreliable data received from the auxiliary bus, as indicated by the data pattern.

According to a second aspect of the invention, the auxiliary bus carries a plurality of data streams, and the interface circuit in each expansion unit is adapted to send the same data in at least two different data streams simultaneously. In this aspect of the invention, each expansion unit has a decision circuit that decides whether the data received in different data streams are identical.

If the received data are identical, the decision circuit outputs the received data. If the received data are not identical, the decision circuit outputs an error signal, and may also replace the received data with a fixed data pattern.

DETAILED DESCRIPTION OF THE INVENTION

Embodiments of the invention will be described with reference to the attached illustrative drawings.

Figure 1:
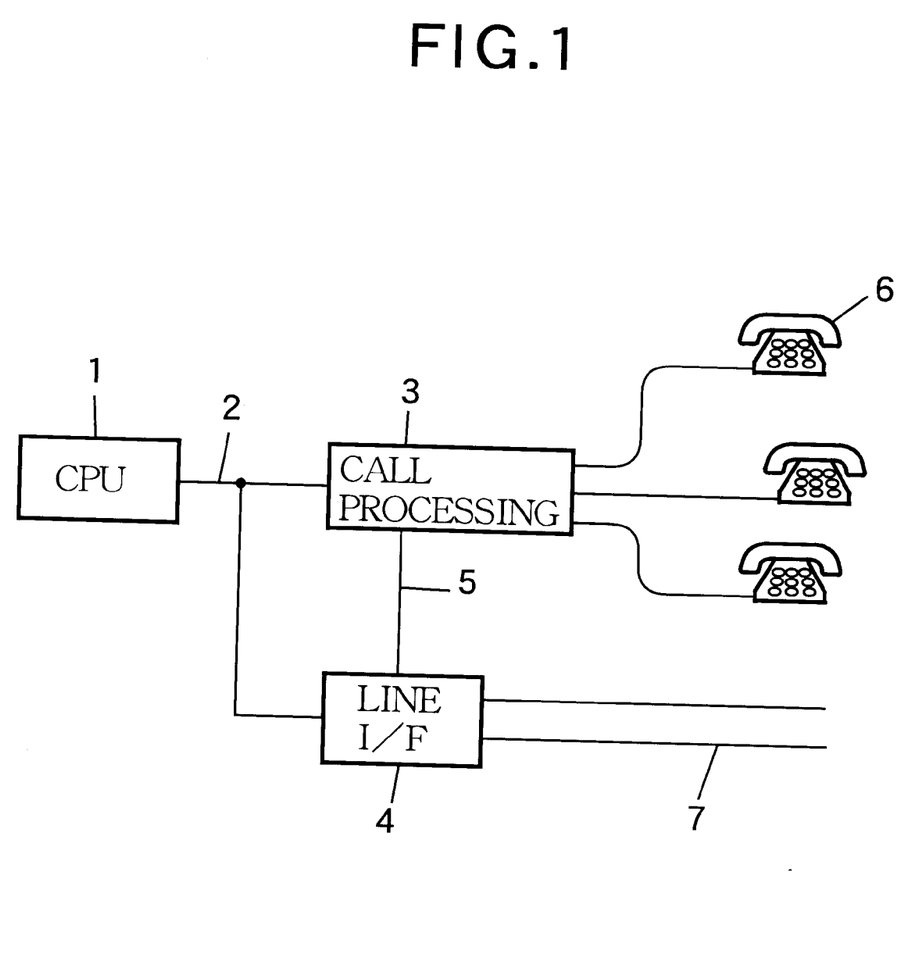
FIG. 1 is a block diagram showing a computer with two expansion units.

FIG. 1 illustrates a computer comprising a central processing unit (CPU) 1 connected by a system bus 2 to two expansion units 3 and 4, which communicate with each other over an MVIP bus 5. Expansion unit 3 is a telephone call-processing board that is coupled to a plurality of telephone sets 6. Expansion unit 4 is a line-interface board that is coupled to a plurality of analog or digital telephone lines 7. These expansion units 3 and 4 enable the computer to provide the functions of a private electronic branch exchange, voice data being transmitted between expansion units 3 and 4 over the MVIP bus 5.

FIG. 1 may be taken as a model for the type of computer system in which the present invention can be used. The invention is not restricted to this model however. There may be more than two expansion units, and the expansion units need not all be installed in the same computer.

When the expansion units are installed in the same computer, the MVIP bus 5 comprises, for example, a forty-conductor flat cable, or a plurality of such cables. The MVIP bus in this case is referred to as a single-chassis bus. When the expansion units are installed in different computers, the MVIP bus 5 comprises, for example, a twisted-pair cable, a coaxial cable, or a fiber-optic cable. The MVIP bus in this case is referred to as a multi-chassis bus.

Figure 2:
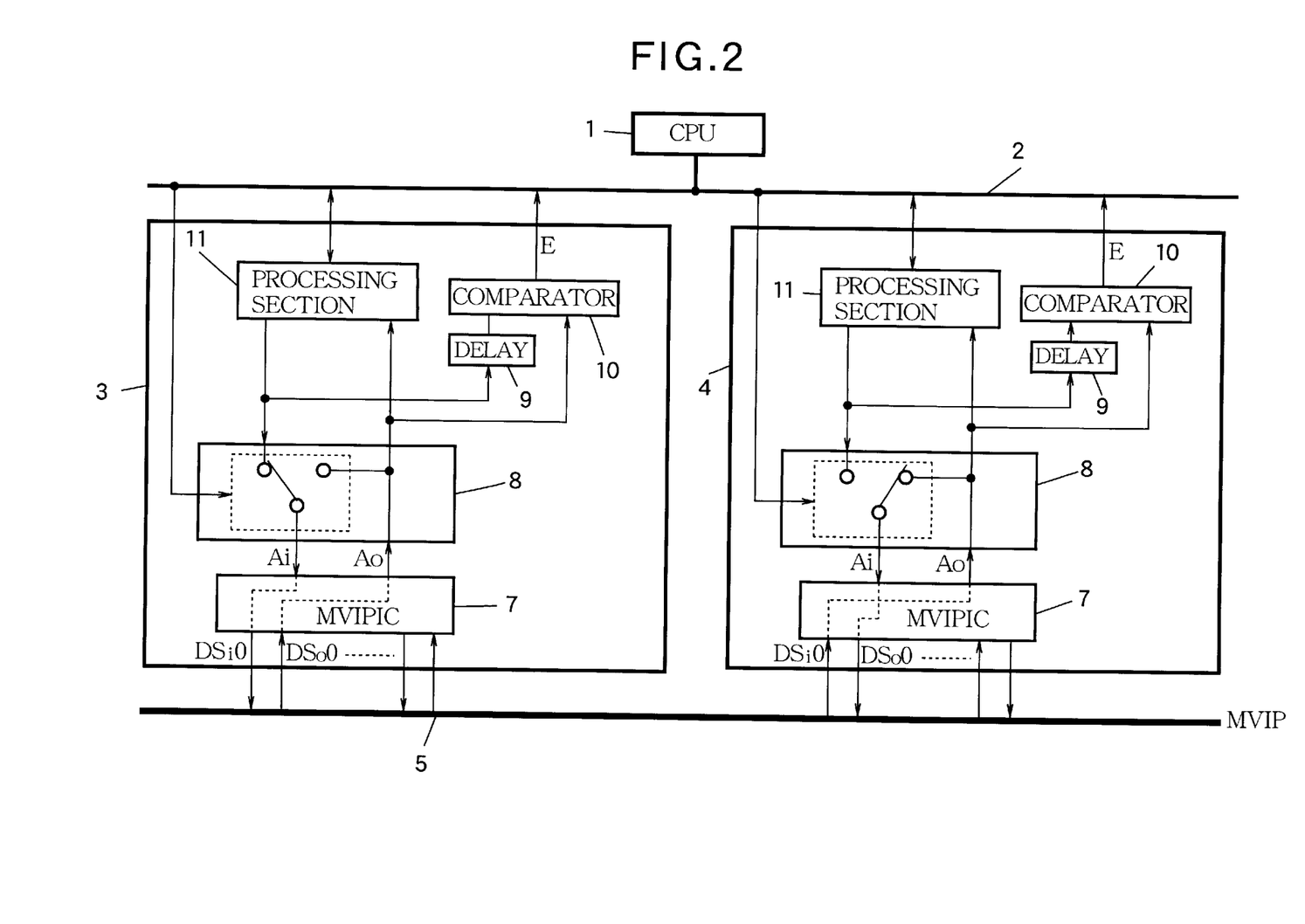
FIG. 2 is a more detailed block diagram of two expansion units illustrating a first embodiment of the invention.

As a first embodiment of the invention, FIG. 2 shows two expansion units 3 and 4 coupled to each other by a single-chassis MVIP bus 5, and coupled by a system bus 2 to a central processing unit 1. Each of the two expansion units 3 and 4 comprises an MVIP interface circuit (MVIPIC) 7, a loop-back circuit 8, a delay buffer 9, a comparator 10, and a processing section 11.

The MVIP interface circuit 7 sends and receives data on the MVIP bus 5 in synchronization with an MVIP bit clock signal, also referred to as the MVIP cable clock signal, and an MVIP frame clock signal. The MVIP interface circuit 7 also communicates with the processing section 11 through the loop-back circuit 8.

Each MVIP interface circuit 7 has a plurality of input and output terminals that are coupled to the MVIP bus 5, and additional local input and output terminals for communicating with other circuits on the same expansion board. In the first embodiment, the loop-back circuit 8 is coupled to a local input terminal Ai and a local output terminal Ao. The MVIP interface circuit 7 receives a serial data stream at terminal Ai and outputs a serial data stream at terminal Ao, both data streams being synchronized with the MVIP bit clock and frame clock. The connections between these local terminals Ai and Ao, and the terminals connected to the MVIP bus 5, are programmable by the central processing unit 1.

Each loop-back circuit 8 has a switch that can be set so that the processing section 11 provides data to be sent on the MVIP bus 5, as shown in FIG. 2 for the expansion unit 3, or so that data received from the MVIP bus 5 are looped around and sent back out through the MVIP interface circuit 7, as shown for the expansion unit 4. Received data are also returned to the processing section 11, regardless of whether or not the received data are looped back to the MVIP interface circuit 7. The switch in the loop-back circuit 8 is controlled by the central processing unit 1.

Data output by the processing section 11 to the loop-back circuit 8 are also sent to the delay buffer 9, which delays received data by one MVIP frame, then provides the delayed data to the comparator 10. The delay buffer 9 comprises, for example, a shift register driven by the MVIP bit clock signal.

The comparator 10 compares the data output by the delay buffer 9 with the data received by the MVIP interface circuit 7 from the MVIP bus 5, and notifies the central processing unit 1 of the result of the comparison by means of an error signal E. The comparator 10 comprises, for example, an exclusive-OR gate, which outputs a binary '0' to indicate matching data and a binary '1' to indicate non-matching data.

The processing section 11 performs the main function of the expansion unit, e.g. interfacing with telephone sets (not visible) in FIG. 2 or telephone lines (not visible)in FIG. 2, or another function such as speech processing or image data processing. Depending on the type of function performed, the processing section 11 may comprise analog circuits, hard-wired logic circuits such as gate-array circuits, a programmable processor such as a microprocessor or digital signal processor, or a combination of these.

Next, the operation of the first embodiment will be described, taking the case in which expansion unit 3 operates in the sending mode and expansion unit 4 operates in the receiving mode.

Figure 3:
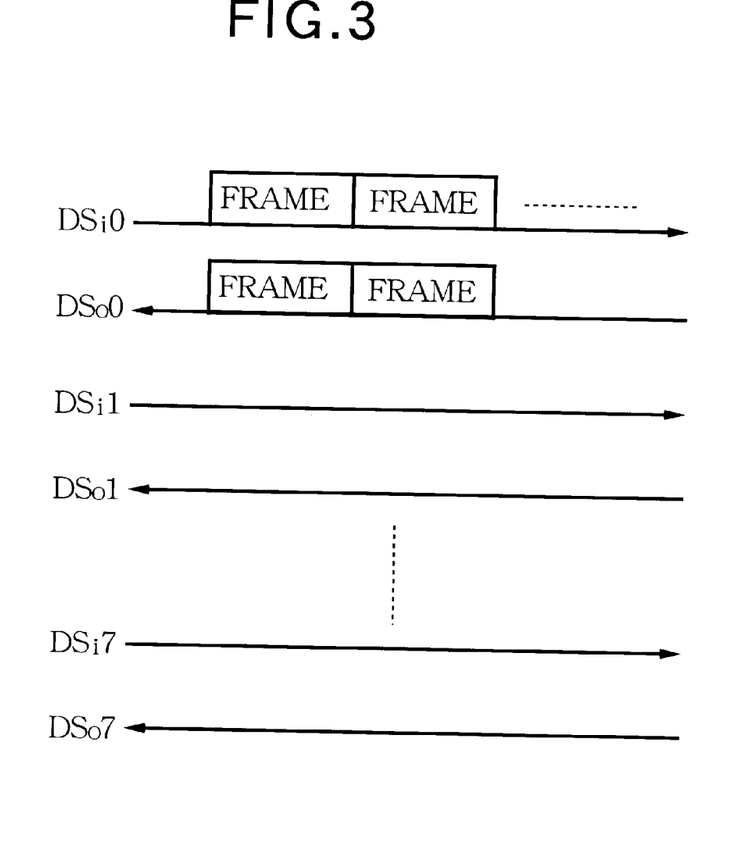
FIG. 3 illustrates serial data streams on an MVIP bus.
Figure 4:
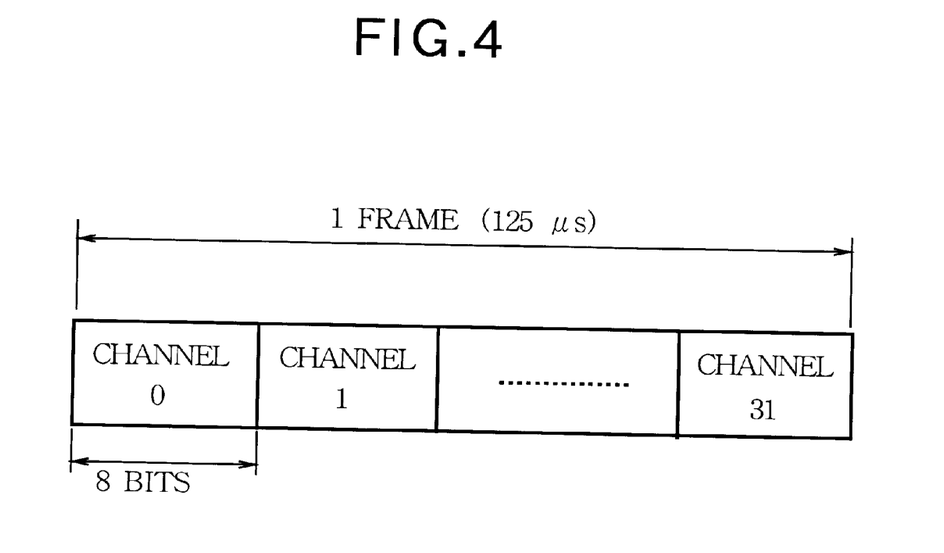
FIG. 4 illustrates the structure of a frame on the MVIP bus.

Referring to FIG. 3, if the MVIP bus 5 comprises a single forty-conductor cable, data can be sent and received in eight pairs of bi-directional serial data streams, numbered DSi0, DSo0, . . . , DSi7, DSo7. The two data streams in each pair carry data in opposite directions, as illustrated, but the directions are programmable. In each data stream, data are sent at a rate of eight thousand frames per second, the frame period being one hundred twenty-five microseconds (125 $\mu$s). Referring to FIG. 4, each frame comprises two hundred fifty-six one-bit time slots (not visible)in FIG. 3, which are divided among thirty-two eight-bit channels (256=32×8). The direction of data flow is programmable on a channel-by-channel basis.

The data input and output at local terminals Ai and Ao of the MVIP interface circuits 7 comprise similar serial data streams, which are also divided into eight-bit channels by time-division multiplexing. The connections between input channels and output channels are programmable.

To have expansion unit 3 send data to expansion unit 4, software running on the central processing unit 1 sets the loop-back circuits 8 as shown in FIG. 2, and programs the MVIP interface circuits 7 as follows.

The MVIP interface circuit 7 in expansion unit 3 is programmed to route data received at terminal Ai for output on data stream DSi0 on the MVIP bus 5, and to route data received from data stream DSo0 on the MVIP bus 5 for output at local terminal Ao, as indicated by the dotted lines in the drawing. The MVIP interface circuit 7 in expansion unit 4 is programmed to route data received from data stream DSi0 to local output terminal Ao, and to route data received at local input terminal Ai for output on data stream DSo0.

The channel-to-channel connections are programmed to provide a total round-trip delay of one frame for all data. This can be done, for example, by connecting each input channel to the output channel eight positions behind in the MVIP frame, as explained below.

The central processing unit 1 then instructs the processing section 11 in the sending expansion unit 3 to begin output of data. The processing section 11 sends a continuous serial data stream to input terminal Ai of the MVIP interface circuit 7 in expansion unit 3, using all thirty-two channels of each frame. The data received in the time slots of channel one, for example, are output in the time slots of channel nine of the same frame in data stream DSi0 on the MVIP bus 5. Other channels are processed similarly, the output channel number being equal to the input channel number plus eight (modulo thirty-two).

In the receiving expansion unit 4, the data received from the MVIP bus 5 in the time slots of channel nine of data stream DSi0 are output in the time slots of channel seventeen at local output terminal Ao, and the same data are received from the loop-back circuit 8 in the same time slots (of channel seventeen) at local input terminal Ai. The MVIP interface circuit 7 then outputs these data in the time slots of channel twenty-five in data stream DSo0 on the MVIP bus 5.

In the sending expansion unit 3, the data received by the MVIP interface circuit 7 in the time slots of channel twenty-five of data stream DSo0 are output in the time slots of channel one of the next frame (25+8=1 modulo 32) at local output terminal Ao. The total delay from input at terminal Ai in expansion unit 3 to output at terminal Ao in expansion unit 3 is therefore exactly one MVIP frame. The same is true for the data in the other channels.

In the sending expansion unit 3, the comparator 10 compares the looped-back data received from terminal Ao of the MVIP interface circuit 7 with the corresponding data stored in the delay buffer 9, which have also been delayed by exactly one MVIP frame, and outputs an error signal E indicating whether the compared data match. The processing section 11 in the sending expansion unit 3 ignores the looped-back data.

If the error signal E output by the comparator 10 indicates that the looped-back data match the data that were sent, it can be safely assumed that the receiving expansion unit 4 has received the data correctly. If error signal E indicates that the looped-back data differ from the data that were sent, then the correctness of the data received by expansion unit 4 is unreliable. In this case, software running on the central processing unit 1 can take appropriate corrective action, such as instructing the processing section 11 in expansion unit 4 to ignore the unreliable data and substitute data interpolated from other received data, or instructing the processing section 11 in expansion unit 3 to send the same data again. The former action would be appropriate for audio data. The latter action would be appropriate for encoded video data or file data in which errors cannot be tolerated.

In selecting corrective action, the software running on the central processing unit 1 has a wide latitude of choice. Minor errors such as one- or two-bit errors in audio data can be ignored, for example. In case of a major error, software can reset or halt the processing sections 11 in the expansion units 3 and 4. The corrective action can also be chosen with regard to the usage status of the MVIP bus 5. For example, a decision as to whether or not to send the same data again could be made according to the availability of alternate data streams on the MVIP bus 5.

By looping back all received data and comparing the looped-back data with the data originally sent, the first embodiment can greatly enhance the reliability of data transfers on the MVIP bus 5. In addition, by allowing software running on the central processing unit 1 to decide how to handle data-transfer errors, the first embodiment enables the type of error handling to be tailored to the content of the data, the severity of the error, and the situation in which the error occurs.

These advantages can moreover be obtained without extensive re-design of existing expansion units. It is only necessary to add the loop-back circuit 8, delay buffer 9, and comparator 10, all of which can be configured from standard, inexpensive parts.

Figure 5:
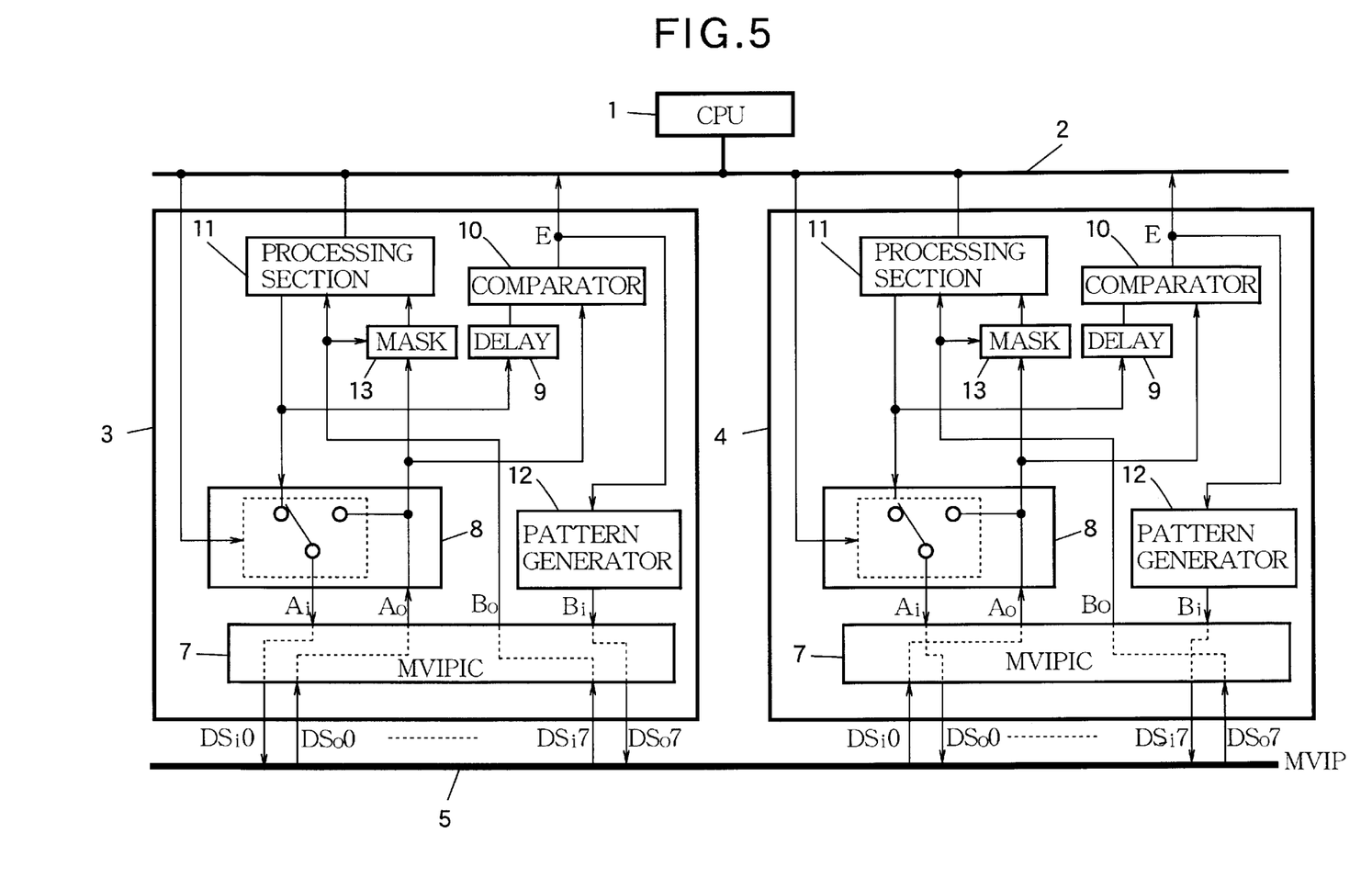
FIG. 5 is a block diagram of two expansion units illustrating a second embodiment of the invention.

Next, a second embodiment will be described with reference to FIG. 5, using the same reference numerals as in FIG. 2 for equivalent elements.

In the second embodiment, the error signal E output by the comparator 10 is supplied to a pattern generator 12 as well as to the central processing unit 1. The pattern generator 12 outputs a first data pattern when the error signal E indicates non-matching data, and a second data pattern when the error signal E indicates matching data. In the following description it will be assumed that the first data pattern is an all-zero pattern, and the second data pattern is an all-one pattern. The MVIP interface circuit 7 receives the data pattern output by the pattern generator 12 at a second local input terminal Bi, and sends the received data pattern on an assigned data stream of the MVIP bus 5.

Data received from another assigned data stream of the MVIP bus are output from a second local output terminal Bo of the MVIP interface circuit 7 to the processing section 11, and to a masking circuit 13. The masking circuit 13, which is disposed on the received data path between the loop-back circuit 8 and the processing section 11, masks the data received from the first local output terminal Ao when the above first data pattern is received from the second local output terminal Bo. When the second data pattern is received from the second local output terminal Bo, the masking circuit 13 passes the data received from the first local output terminal Ao to the processing section 11 without alteration. The masking circuit 13 can be configured from, for example, an AND logic gate.

Next, the operation of the second embodiment will be described for the case in which expansion unit 3 operates in the sending mode and expansion unit 4 operates in the receiving mode.

The central processing unit 1 programs the MVIP interface circuits 7 in expansion units 3 and 4 so that data output by the processing section 11 in expansion unit 3 are sent to expansion unit 4 in data stream DSi0 and looped back in data stream DSo0, using local terminals Ai and Ao in each expansion unit, as in the first embodiment. In addition the MVIP interface circuits 7 are programmed so that data received at local input terminal Bi of the MVIP interface circuit 7 in expansion unit 3 are sent in MVIP data stream DSo7 to the MVIP interface circuit 7 in expansion unit 4, and output at local output terminal Bo in expansion unit 4.

Local output terminal Bo in expansion unit 3 and local input terminal Bi in expansion unit 4 are similarly interconnected via data stream DSi7, although these terminals are not used in the operations described below.

In expansion unit 3, as long as the looped-back data output at local terminal Ao 3 match the data that the processing section 11 sent to local terminal Ai, the pattern generator 12 outputs the second (e.g. all-one) data pattern, which is sent via data stream DSo7 to terminal Bo in expansion unit 4. Receiving this second data pattern, the masking circuit 13 in expansion unit 4 passes the data received from local terminal Ao without alteration to the processing section 11, which processes the data in the normal manner.

When the comparator 10 in expansion unit 3 detects a mis-match, the resulting error signal E causes the pattern generator 12 to output the first (e.g. all-zero) data pattern, which is again sent to expansion unit 4 and output at local terminal Bo. Receiving this first data pattern, the masking circuit 13 in expansion unit 4 masks the data received from local terminal Ao, so that the processing section 11 in expansion unit 4 receives, for example, all-zero data instead of the data that actually arrived on data stream Dsi0.

In addition, the processing section 11 in expansion unit 4 receives the second data pattern from local terminal Bo, and can immediately take action to deal with the error. If, for example, the processing section 11 comprises a microprocessor or digital signal processor, the data received from local terminal Bo can be supplied to the processing section 11 as an interrupt signal, activating an interrupt handler that takes appropriate error-processing action. If the processing section 11 comprises hard-wired logic, the data received from local terminal Bo can be used as a reset signal.

In the meantime, expansion unit 3 continues to send data on data stream DSi0, and expansion unit 4 continues to loop the data back to expansion unit 3 on data stream DSo0. When the looped-back data again match the data that were sent, the pattern generator 12 in expansion unit 3 reverts to output of the second data pattern, the masking circuit 13 in expansion unit 4 stops masking the data received on data stream DSi0, and normal processing resumes.

The second embodiment can be used, for example, to provide an automatic muting function that prevents telephone users from being annoyed by loud or erratic sounds caused by electrical noise on the MVIP bus 5.

The error signal E is also sent to the central processing unit 1 as in the first embodiment, so that software running on the central processing unit 1 can take additional action if necessary. In case of a persistent error, for example, software running on the central processing unit 1 can reset the processing section 11 in expansion unit 3. The second embodiment is particularly useful, however, when the processing section 11 in the receiving expansion unit 4 comprises a processor that can be programmed for autonomous error handling, without requiring intervention by the central processing unit 1.

The second embodiment is also particularly useful when other expansion units are connected to the MVIP bus 5, in addition to expansion units 3 and 4. In this case, the data pattern output by the pattern generator 12 can be used to warn the other expansion units that an error has occurred, so that they can take appropriate action, such as temporarily reducing or suspending usage of the MVIP bus.

Figure 6:
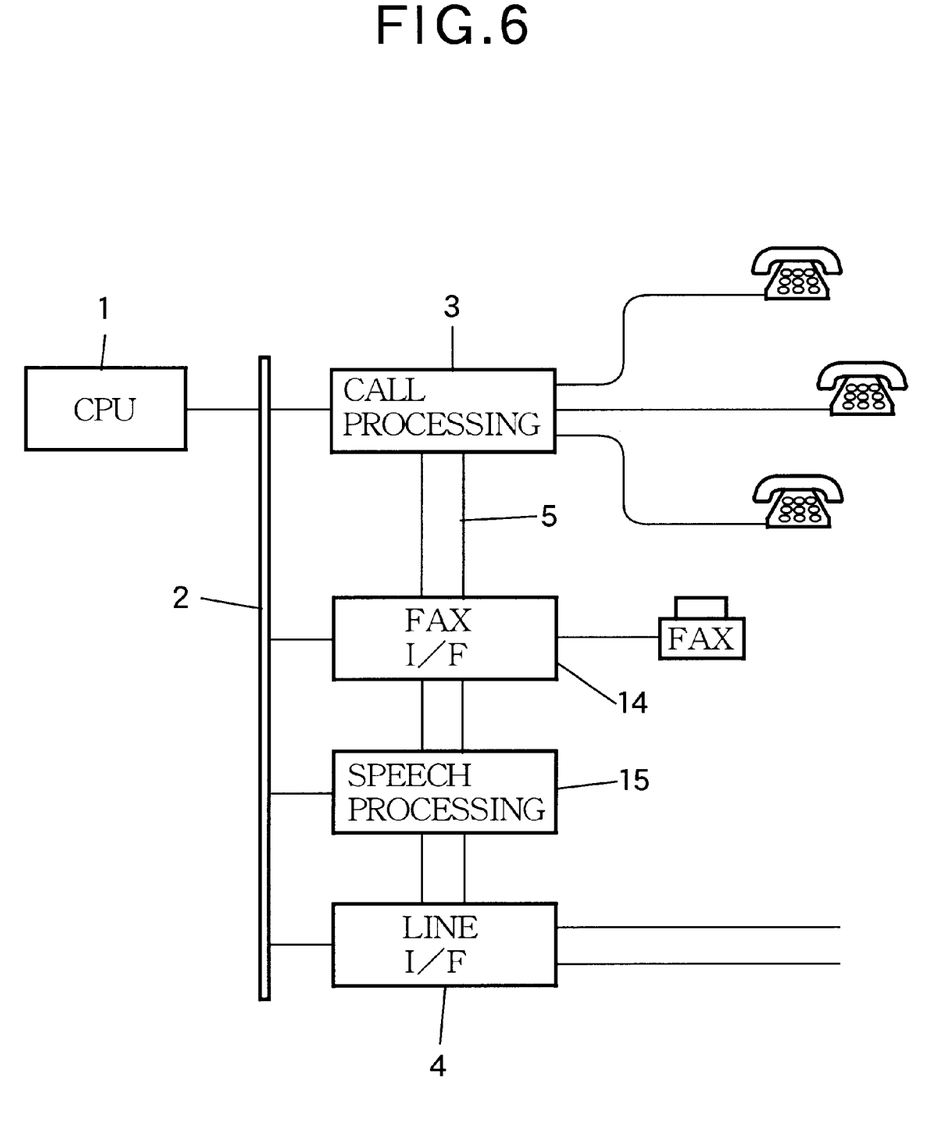
FIG. 6 is a block diagram showing a computer with four expansion units.

FIG. 6 shows an example in which a telephone call-processing board 3, a facsimile interface board 14, a speech processing board 15, and a line-interface board 4 are connected to the MVIP bus 5. The speech processing board 15 is used, for example, to automate the handling of calls and the switching of calls between voice and facsimile. The second embodiment can be advantageously used in this system to notify the facsimile interface board 14 and speech processing board 15 of transmission errors made between the call processing board 3 and line-interface board 4.

Next, a third embodiment will be described with reference to FIGS. 7 and 8. This embodiment illustrates the second aspect of the invention.

Figure 7:
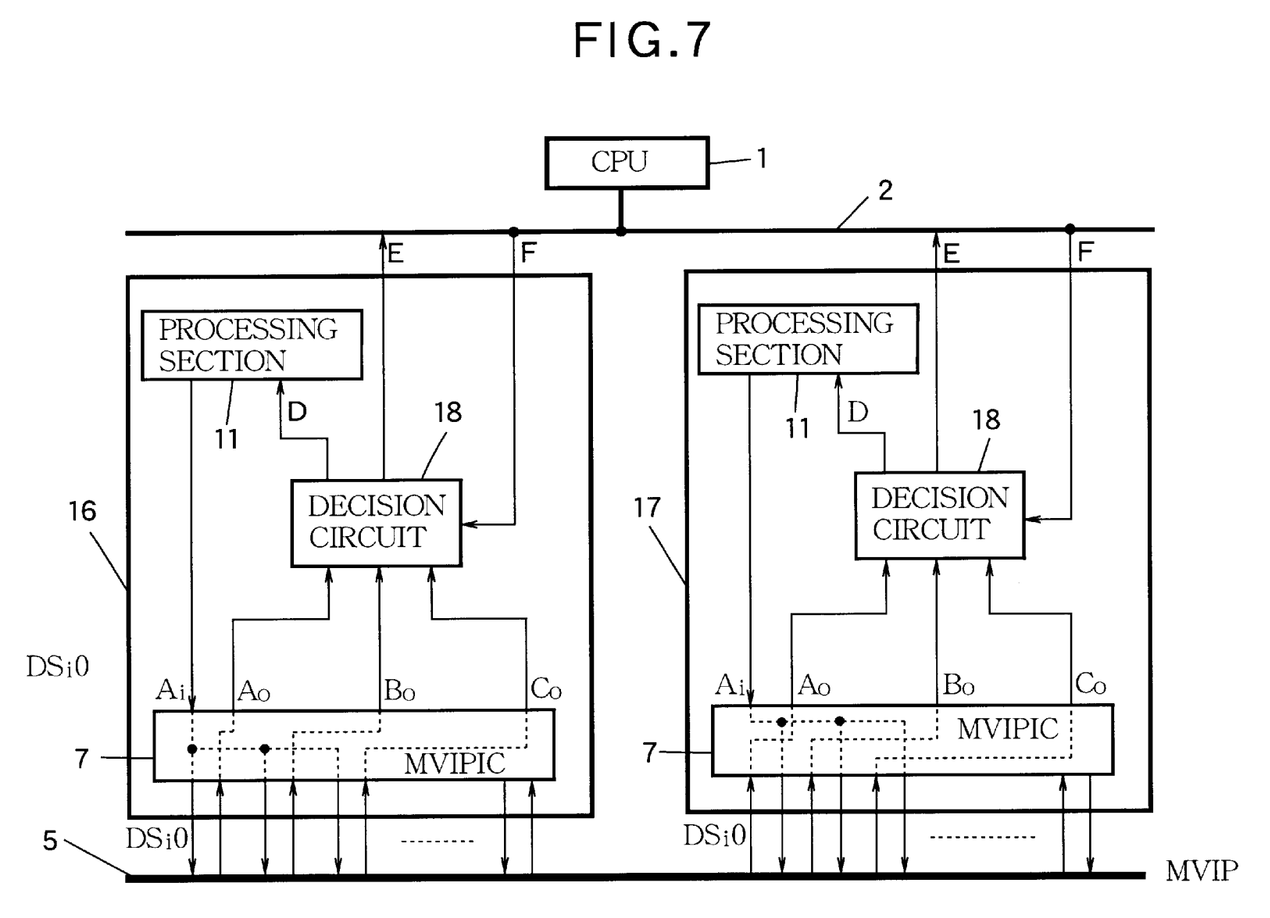
FIG. 7 is a block diagram of two expansion units illustrating a third embodiment of the invention.

Referring to FIG. 7, the expansion units 16 and 17 in the third embodiment each comprise an MVIP interface circuit 7 and a processing section 11 as in the preceding embodiments, and a decision circuit 18. The MVIP interface circuits 7 in the third embodiment are programmed so that when the processing section 11 sends data to local input terminal Ai, the same data are provided for output on three different outgoing data streams, e.g. DSi0, DSi1, and DSi2 in expansion unit 3, or DSo0, DSo1, and DSo2 in expansion unit 4. MVIP interface circuits having this broadcast capability are readily available.

Data received from the corresponding incoming data streams, e.g. DSo0, DSo1, and DSo2 in expansion unit 3, or DSi0, DSi1, and DSi2 in expansion unit 4, are coupled to respective local output terminals Ao, Bo, and Co of the MVIP interface circuit 7, and sent from these terminals to the decision circuit 18. The decision circuit 18 provides received data D to the processing section 11, and an error signal E to the central processing unit 1. The decision circuit 18 is controlled by a control signal F from the central processing unit 1.

Figure 8:
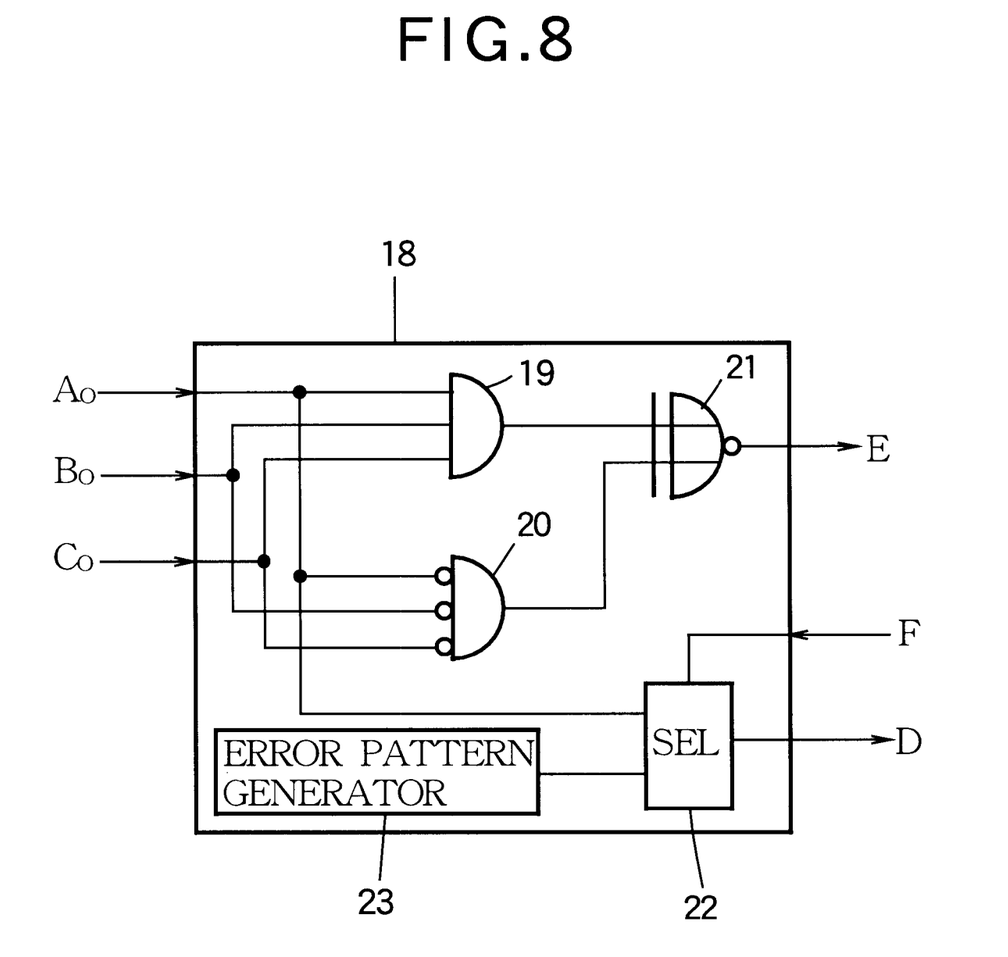
FIG. 8 is a more detailed block diagram of the decision circuit in the third embodiment.

Referring to FIG. 8, the decision circuit 18 comprises a three-input AND gate 19, a three-input NOR gate 20 (shown in equivalent form as a three-input AND gate with inverted inputs), a two-input exclusive-NOR gate 21, a data selector 22, and an error pattern generator 23. Data received from local output terminals Ao, Bo, and Co of the MVIP interface circuit 7 are supplied to both AND gate 19 and NOR gate 20. The outputs of AND gate 19 and NOR gate 20 are combined by exclusive-NOR gate 21 to generate the error signal E. The selector 22 selects either the data received from local output terminal Ao or the data output by the error pattern generator 23, according to the control signal F from the central processing unit 1, and outputs the selected data D to the processing section 11. The error pattern generator generates a fixed data pattern, such as an all-zero pattern.

Next, the operation of the third embodiment will be described for the case in which expansion unit 16 in FIG. 7 operates in the sending mode, and expansion unit 17 operates in the receiving mode.

The processing section 11 in expansion unit 16 provides local input terminal Ai of the MVIP interface circuit 7 with data to be sent on the MVIP bus 5. The MVIP interface circuit 7 in expansion unit 16 sends the provided data identically on data streams DSi0, DSi1, and DSi2.

In expansion unit 17, the MVIP interface circuit 7 routes data streams DSi0, DSi1, and DSi2 to local output terminals Ao, Bo, and Co, respectively, and thence to the decision circuit 18. When '0' data are received on all three data streams, the output of AND gate 19 in FIG. 8 is '0' while the output of NOR gate 20 is '1,' so the output E of exclusive-NOR gate 21 is '0,' indicating that there is no error. Similarly, when '1' data are received on all three data streams, the output of AND gate 19 in FIG. 8 is '1' while the output of NOR gate 20 is '0,' and the output E of exclusive-NOR gate 21 is again '0,' indicating no error. When the data on data streams DSi0, DSi1, and DSi2 are neither all '0' nor all '1,' the outputs of AND gate 19 and NOR gate 20 are both '0' and the output E of exclusive-NOR gate 21 is '1,' indicating an error. In short, the error signal E indicates whether the data in all three data streams DSi0, DSi1, and DSi2 agree or not.

As long as the error signal E indicates agreement of the data in data streams DSi0, DSi1, and DSi2, software running on the central processing unit 1 leaves the control signal F set in a state that causes the selector 22 to select the data received from local output terminal Ao (data stream DSi0), and these data are supplied as data D to the processing section 11. When the error signal E indicates disagreement, however, software can change control signal F to a state that causes the selector 22 to select the fixed data pattern generated by the error pattern generator 23 for output as data D.

Software running on the central processing unit 1 can also take appropriate action with regard to the processing sections 11 in the expansion units 17 and 18, such as resetting these processing sections 11, or having the same data sent again. As in the first embodiment, a flexible response is possible, depending on the type of data, the severity of the error, and the current state of usage of the MVIP bus 5.

When the data being sent are audio data and the error pattern generator 23 generates an all-zero pattern, the third embodiment can be used for automatic muting of data transmission errors caused by electrical noise on the MVIP bus 5. When the processing section 11 in the receiving expansion unit 17 comprises a microprocessor or digital signal processor that can be programmed to recognize the fixed error data pattern, more sophisticated types of error handling can be implemented. An advantage of the third embodiment is that errors are detected as soon as the data are received, so corrective action can be taken within the receiving expansion unit on a real-time basis.

The embodiments above double or triple the amount of data transferred on the MVIP bus, but in the inventor's experience, most systems employing auxiliary buses such as the MVIP bus use only a fraction of the data-carrying capacity of the bus (one-tenth of the capacity, for example). Often there will be more than enough reserve capacity to permit practice of the present invention.

An advantage of the present invention is that data reliability is gained without increasing the processing load of the central processing unit 1 or processing section 11. In this regard the present invention is superior to systems employing error-correcting codes, which must be decoded by the receiving expansion unit.

The embodiments described above can be modified in various obvious ways. In the third embodiment, for example, identical data can be sent on any number of data streams equal to or greater than two data streams; the number of data streams is a design choice that can be made according to the desired level of reliability. The error signal E can be provided to the processing section 11, as well as, or instead of, being provided to the central processing unit 1. The processing circuit 11 can then generate the control signal F. The configuration of logic gates in the decision circuit 18 can be modified, e.g. by use of a three-input NAND gate instead of AND gate 19, and an exclusive-OR gate instead of exclusive-NOR gate 21.

If the MVIP interface circuit 7 does not permit broadcast connections of the type illustrated in FIG. 7, the processing section 11 can send the same data stream to two or more different local input terminals of the MVIP interface circuit 7.

In the first and second embodiments, the loop-back circuit 8 can be eliminated by programming the MVIP interface circuit 7 to connect two different data streams on the MVIP bus 5, so that the data are looped back internally in the MVIP interface circuit 7.

The data in the first and second embodiments were described as undergoing a delay equivalent to eight channels, or one-fourth of an MVIP frame, in each passage through each MVIP interface circuit 7, but this is not a restriction. The MVIP interface circuits 7 can be programmed for other delays, as long as the total round-trip delay equals the delay produced by the delay buffer 9. Depending on the length of the shift register in the delay buffer 9, this total delay need not be equal to one MVIP frame, but may be shorter or longer.

The delay buffer 9 can be configured in various ways, and is not limited to the use of a shift register.

The serial data stream received at a local input terminal of an MVIP interface circuit does not have to be sent as a single data stream on the MVIP bus, but may be divided among two or more data streams on the MVIP bus. Similarly, channels from two or more different streams on the MVIP bus may be routed to a single local output terminal of a MVIP interface circuit.

The serial data streams input and output at the local terminals of the MVIP interface circuits need not have the same data rate as the data streams on the MVIP bus. The local data rates may be higher, if two or more MVIP-bus data streams are used to transfer each local data stream.

The embodiments above have been described in relation to the MVIP standard, but the present invention can also be practiced in expansion units complying with other standards, such as the signal computing system architecture (SCSA) standard, or more generally in any expansion units that communicate over an auxiliary bus.

Applications of the present invention are not limited to computer-telephony integration. The invention is particularly useful when an auxiliary bus is used for transferring image data or file data that must be kept error-free.

Those skilled in the art will recognize that further variations are possible within the scope claimed below.

What is claimed is:

1. A method of sending data from a first expansion unit installed in a computer to a second expansion unit installed in the same or a different computer, comprising the steps of:

sending said data directly from said first expansion unit to said second expansion unit on an auxiliary bus;

temporarily storing said data in said first expansion unit;

sending said data back directly from said second expansion unit to said first expansion unit on said auxiliary bus;

comparing the data sent back from said second expansion unit to said first expansion unit with the data temporarily stored in said first expansion unit;

outputting an error signal indicating whether the data sent back from said second expansion unit to said first expansion unit match the data temporarily stored in said first expansion unit;

supplying said error signal to a central processing unit in the computer in which said first expansion unit is installed; and by using software running on said central processing unit, taking corrective action by controlling at least one expansion unit among said first expansion unit and said second expansion unit, when said error signal indicates that the data sent back from said second expansion unit to said first expansion unit do not match the data temporarily stored in said first expansion unit.

2. The method of claim 1, wherein said corrective action is responsive to content of the data sent from said first expansion unit to said second expansion unit.

3. The method of claim 1, wherein said corrective action is responsive to usage status of said auxiliary bus.

4. A method of sending data from a first expansion unit installed in a computer to a second expansion unit installed in the same or a different computer, comprising the steps of:

sending said data directly from said first expansion unit to said second expansion unit on an auxiliary bus;

temporarily storing said data in said first expansion unit;

sending said data back directly from said second expansion unit to said first expansion unit on said auxiliary bus;

comparing the data sent back from said second expansion unit to said first expansion unit with the data temporarily stored in said first expansion unit;

outputting an error signal indicating whether the data sent back from said second expansion unit to said first expansion unit match the data temporarily stored in said first expansion unit;

generating a data pattern responsive to said error signal in said first expansion unit; and sending said data pattern from said first expansion unit directly to said second expansion unit on said auxiliary bus, thereby informing said second expansion unit as to whether the data sent back from said second expansion unit to said first expansion unit matched the data temporarily stored in said first expansion unit.

5. The method of claim 4, wherein a third expansion unit is also coupled to said auxiliary bus, and said data pattern is sent simultaneously from said first expansion unit to both said second expansion unit and said third expansion unit, thereby also notifying said third expansion unit as to whether the data sent back from said second expansion unit to said first expansion unit matched the data temporarily stored in said first expansion unit.

6. The method of claim 4, wherein said auxiliary bus carries a plurality of data streams, said step of sending said data directly from said first expansion unit to said second expansion unit being performed in a first data stream on said auxiliary bus, and said step of sending said data pattern directly from said first expansion unit to said second expansion unit being performed in a second data stream on said auxiliary bus.

7. The method of claim 6, comprising the further step of:
   masking the data received in said first data stream in said second expansion unit, responsive to the data pattern received in said second data stream in said second expansion unit.

8. An expansion unit installed in a computer and communicating with another unit on an auxiliary bus, said expansion unit having an interface circuit for sending and receiving data on the auxiliary bus and a processing section for supplying the interface circuit with data to be sent on the auxiliary bus, said expansion unit also comprising:
   a delay buffer coupled to said processing section, for temporarily storing the data supplied by said processing section after said data have been sent by said interface circuit on said auxiliary bus;
   a loop-back circuit coupled to said interface circuit, for looping data received by said interface circuit from said auxiliary bus back to said interface circuit to be sent again on said auxiliary bus; and
   a comparator coupled to said interface circuit, for comparing the data temporarily stored in said delay buffer with data received by said interface circuit from said auxiliary bus, and generating an error signal indicating whether the data temporarily stored in said delay buffer match the data received by said interface circuit from said auxiliary bus; and
   a pattern generator coupled to said interface circuit, for generating a data pattern responsive to said error signal and supplying said data pattern to said interface circuit to be sent on said auxiliary bus,
   wherein said expansion unit operates in a sending mode and a receiving mode, said delay buffer and said comparator operating in said sending mode, said loop-back circuit operating in said receiving mode.

9. The expansion unit of claim 8, further comprising:
   a pattern generator coupled to said interface circuit, for generating a data pattern responsive to said error signal and supplying said data pattern to said interface circuit to be sent on said auxiliary bus.

10. The expansion unit of claim 8, wherein said auxiliary bus carries a plurality of data streams, and in said sending mode, said interface circuit sends the data supplied by said processing section and the data pattern supplied by said pattern generator in different data streams on said auxiliary bus.

11. The expansion unit of claim 10, further comprising a masking circuit coupled to said interface circuit, for supplying data received by said interface circuit in a first data stream on said auxiliary bus to said processing section, and for masking the data received by said interface circuit in said first data stream responsive to a data pattern received by said interface circuit in a second data stream on said auxiliary bus.

12. The expansion unit of claim 11, wherein the data pattern received in said second data stream is also supplied to said processing section.

13. An expansion unit installed in a computer and communicating with another unit on an auxiliary bus, said expansion unit having an interface circuit for sending and receiving data on the auxiliary bus and a processing section for supplying the interface circuit with data to be sent on the auxiliary bus, said expansion unit also comprising:
   a delay buffer coupled to said processing section, for temporarily storing the data supplied by said processing section after said data have been sent by said interface circuit on said auxiliary bus;
   a loop-back circuit coupled to said interface circuit, for looping data received by said interface circuit from said auxiliary bus back to said interface circuit to be sent again on said auxiliary bus, wherein said loop-back circuit comprises a switch that supplies said interface circuit with data from said processing section in said sending mode, and supplies said interface circuit with data received by said interface circuit from said auxiliary bus in said receiving mode; and
   a comparator coupled to said interface circuit, for comparing the data temporarily stored in said delay buffer with data received by said interface circuit from said auxiliary bus, and generating an error signal indicating whether the data temporarily stored in said delay buffer match the data received by said interface circuit from said auxiliary bus; wherein said expansion unit operates in a sending mode and in a receiving mode, said delay buffer and said comparator operating in said sending mode, said loop-back circuit operating in said receiving mode.

14. A method of sending data from a first expansion unit installed in a computer to a second expansion unit installed in the same or a different computer over an auxiliary bus carrying a plurality of data streams, comprising the steps of:
   sending identifcal data directly from said first expansion unit to said second expansion unit in at least two different data streams on said auxiliary bus;
   comparing the data received in said different data streams in said second expansion unit; and
   outputting an error signal indicating whether the data received in said different data streams are mutually identical;
   supplying said error signal to a central processing unit in the computer in which said second expansion unit is installed; and
   using software running on said central processing unit, taking corrective action by controlling at least one expansion unit among said first expansion unit and said second expansion unit, when said error signal indicates that the data received in said different data streams are not mutually identical.

15. The method of claim 14, wherein said corrective action is responsive to content of the data sent from said first expansion unit to said second expansion unit.

16. The method of claim 14, wherein said corrective action is responsive to usage status of said auxiliary bus.

17. A method of sending data from a first expansion unit installed in a computer to a second expansion unit installed in the same or a different computer over an auxiliary bus carrying a plurality of data streams, comprising the steps of:
   sending identical data directly from said first expansion unit to said second expansion unit in at least two different data streams on said auxiliary bus;

comparing the data received in said different data streams in said second expansion unit;

outputting an error signal indicating whether the data received in said different data streams are mutually identical;

generating fixed data in said second expansion unit;

generating a control signal from said error signal;

selecting between said fixed data and the data received in one of said different data streams, according to said control signal; and supplying the data thus selected to a processing section in said second expansion unit.

18. The method of claim 17, comprising the further step of:

supplying said error signal to a central processing unit in the computer in which said second expansion unit is installed, said control signal being generated in said central processing unit.

19. An expansion unit installed in a computer and communicating with another expansion unit on an auxiliary bus carrying a plurality of incoming data streams and a plurality of outgoing data streams, said expansion unit having a processing section for processing the data sent and received on the auxiliary bus, and comprising:

an interface circuit for sending data supplied by said processing section identically in at least two different outgoing data streams on said auxiliary bus, and for receiving data from at least two different incoming data streams on said auxiliary bus; and a decision circuit coupled to said interface circuit, for comparing the data received by said interface circuit from said different incoming data streams, generating an error signal indicating whether identical data are received from said different incoming data streams, and supplying the data received from one of said different incoming data streams to said processing section, wherein said decision circuit comprises:

a logic circuit for generating said error signal;

an error pattern generator for generating fixed data; and a selector for selecting between said fixed data and the data received in said one of said different incoming data streams, responsive to a control signal, the data selected by said selector being supplied to said processing section.

20. The expansion unit of claim 19, wherein said decision circuit supplies said error signal to a central processing unit in the computer in which said expansion unit is installed, and said central processing unit generates said control signal.

* * * * *